UNITED STATES PATENT OFFICE.

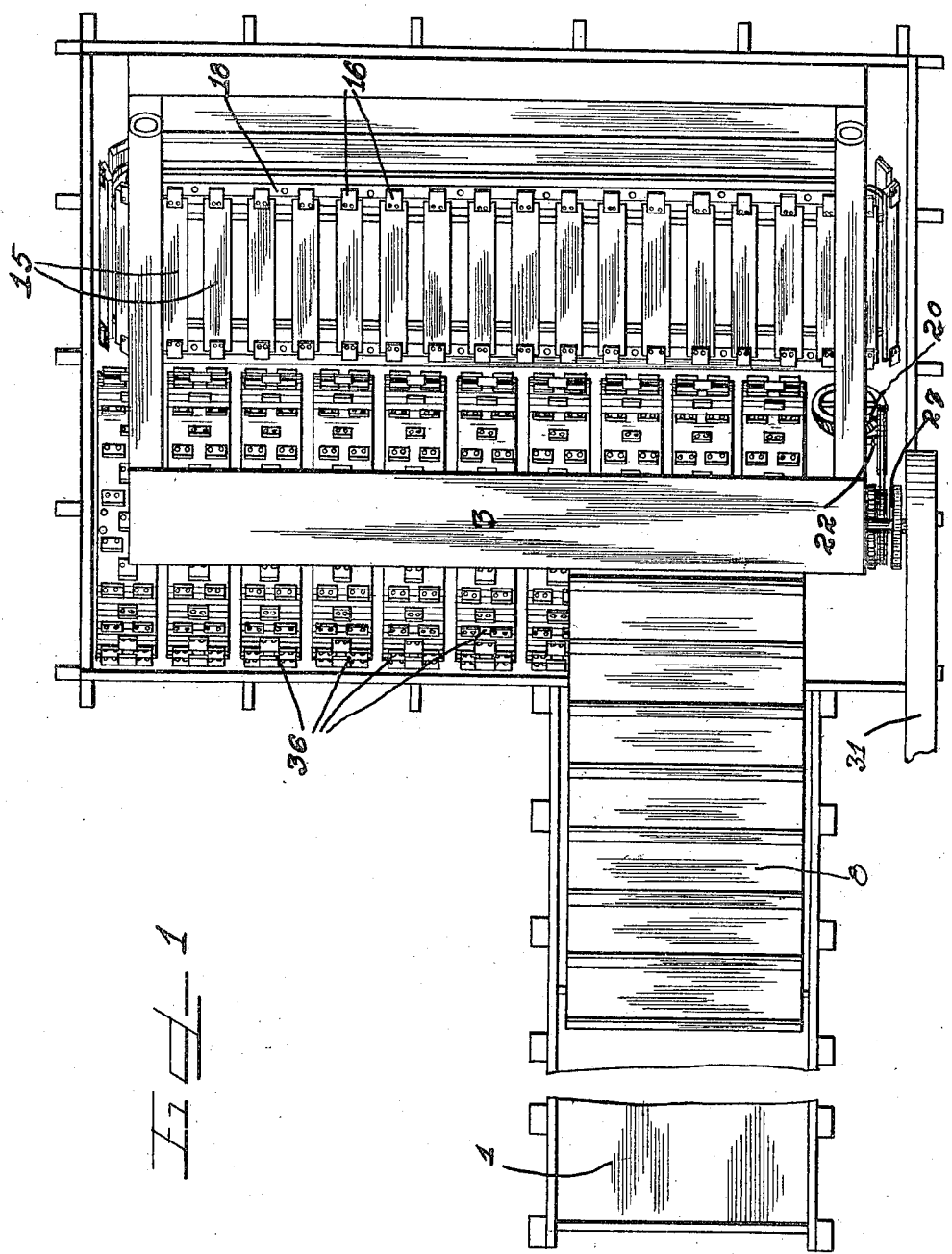

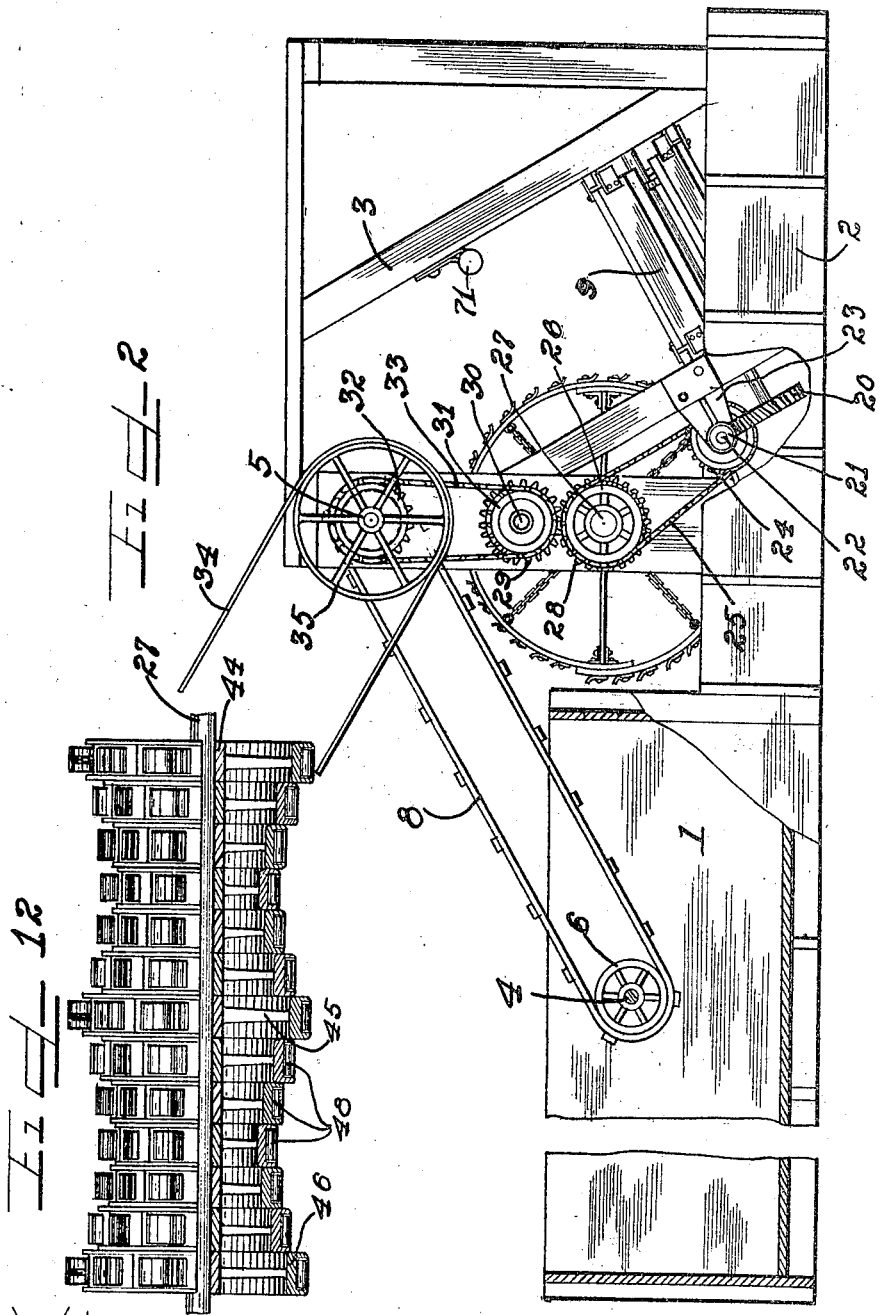

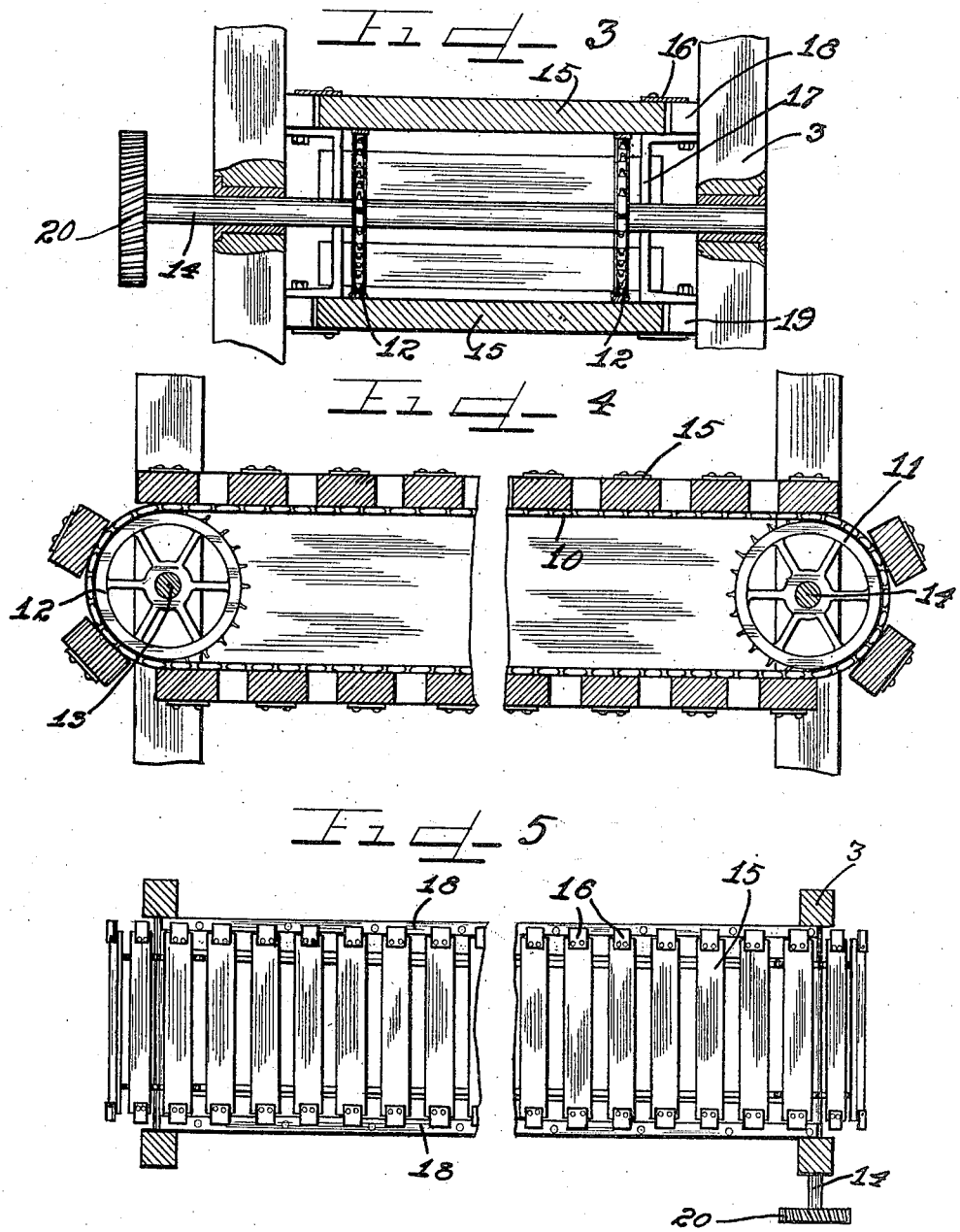

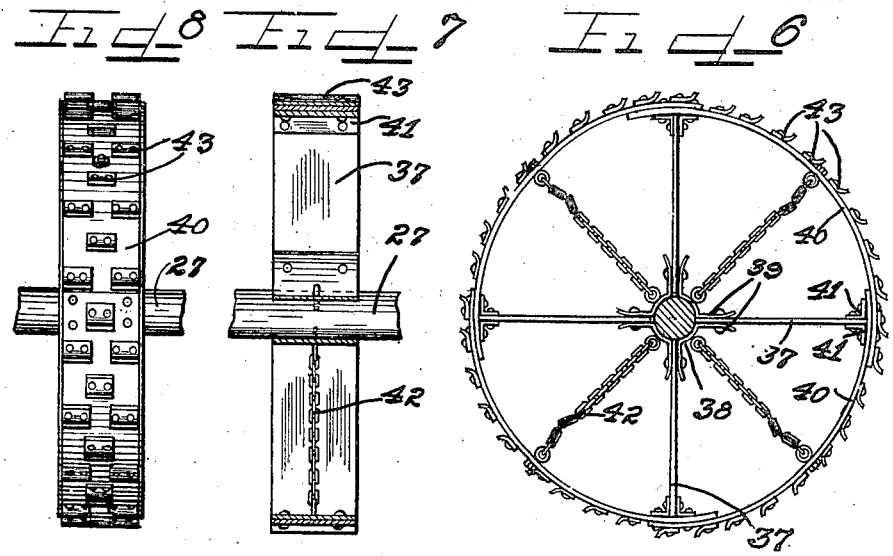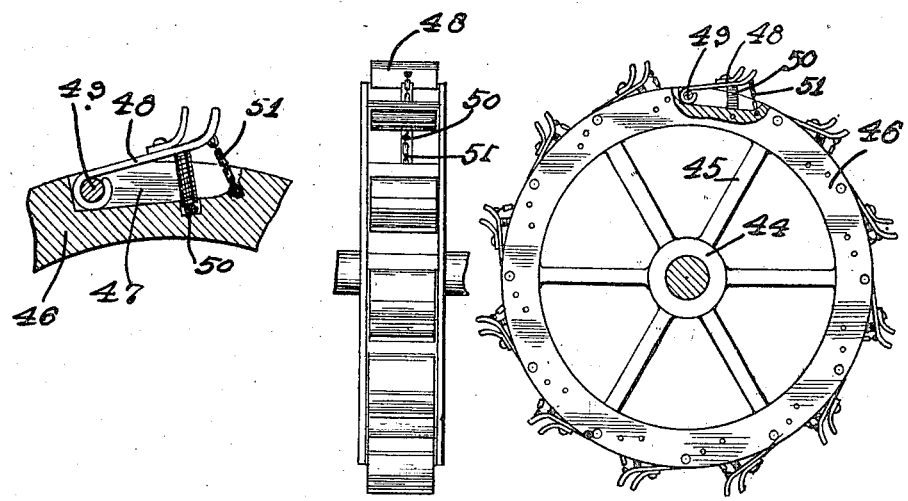

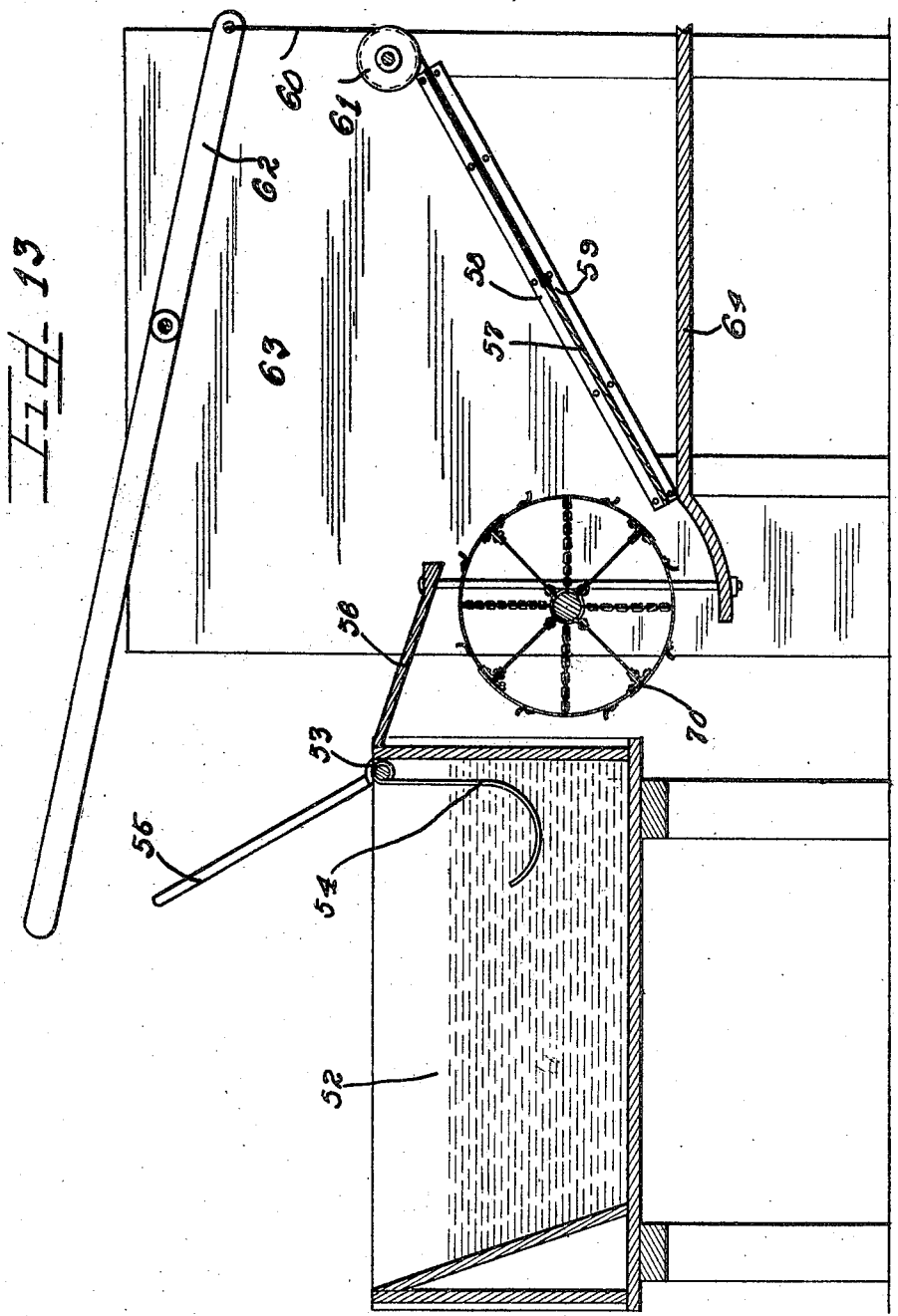

JOHN W. KOHLHEPP, OF LOS ANGELES, CALIFORNIA, ASSIGNOR TO THE ALLBRIGHT-NELL COMPANY, OF CHICAGO, ILLINOIS, A CORPORATION OF ILLINOIS.

HOG SCRAPING AND CLEANING MACHINE.

1,323,635.  Specification of Letters Patent.  Patented Dec. 2, 1919.

Application filed October 27, 1917. Serial No. 198,764.

*To all whom it may concern:*

Be it known that I, JOHN W. KOHLHEPP, a citizen of the United States, and a resident of the city of Los Angeles, in the county of Los Angeles and State of California, have invented certain new and useful Improvements in Hog Scraping and Cleaning Machines; and I do hereby declare that the following is a full, clear, and exact description of the same, reference being had to the accompanying drawings, and to the numerals of reference marked thereon, which form a part of this specification.

An objection to hog dehairing machines of the beater type is that the beating of the carcasses very often separates the fat from the lean meat and it is an object of this invention to provide a machine in which this is overcome.

It is also an object of this invention to provide a flexible scraping and massaging mechanism which, while acting to thoroughly dehair, clean and polish the carcasses, yet accomplishes all this without beating the carcasses, and acts gently on the carcasses for the purpose specified.

It is a very important object of this invention to provide a flexible scraping wheel which is adapted to act on carcasses traveling therepast or on carcasses supported adjacent thereto and to thoroughly dehair and clean the same.

It is further an object of this invention to provide a mechanism in which the scraping and massaging wheels continuously rotate the carcass as it passes thereby or is supported adjacent thereto, thereby subjecting the entire carcass to the action of the scraping wheels to thoroughly clean the same.

It is further an object of this invention to provide a flexible wheel scraping device in which the periphery of the wheel is normally held outwardly in operation by the centrifugal throw of flexible attaching members, but in which the periphery of the wheel is adapted to yield at any or all points adapting the wheel to accommodate itself to all size carcasses.

Other and further important objects of this invention will be apparent from the disclosure in the specification and drawings.

The invention (in a preferred form) is illustrated in the drawings and hereinafter more fully described.

On the drawings:

Figure 1 is a top plan view of a machine embodying my invention.

Fig. 2 is a side elevation thereof with parts of the vats broken away.

Fig. 3 is a cross-section of the carcass supporting and advancing conveyer.

Fig. 4 is a longitudinal vertical section thereof.

Fig. 5 is a top plan view thereof.

Fig. 6 is a side elevation of a scraping and massaging wheel.

Fig. 7 is a vertical central section thereof.

Fig. 8 is a front elevation of the wheel.

Fig. 9 is a side elevation of a modified form of wheel.

Fig. 10 is a front elevation thereof.

Fig. 11 is an enlarged fragmentary detail showing the method of attaching the scraping blades.

Fig. 12 illustrates one method of arranging the wheels on the scraper shaft.

Fig. 13 illustrates a modified form of machine embodying my invention.

As shown on the drawings:

The reference numeral 1, indicates a scalding vat, 2, a vat for catching the hair and refuse, 3, the framework for supporting the mechanism. A shaft 4, is journaled in the scalding vat, and a drive shaft 5, is journaled to the frame 3, provided with suitable sprocket or friction wheels 6, around which is trained the conveyer 8, for delivering hogs to the carcass supporting and advancing conveyer, indicated as a whole by the reference numeral 9, in Fig. 2.

Said advancing conveyer is shown as inclined and consists of sprocket chains 10, one at each side thereof, which are trained around sprocket wheels 11—12, secured to the shafts 13—14, journaled to the frame. Slats or lags 15, are rigidly secured at their ends to the sprocket chains and plates 16, are secured to the ends of the slats to prevent sagging of the conveyer away from the scraping wheels. As shown in Fig. 3, bars 18—19, are secured to the frame between which and secured thereto are U-beams 17, on the upper webs of which the upper slats rest and the lower slats are engaged beneath the lower webs thereof. Said plates 16, as shown, ride on the bars 18, and the lower plates engage below the bars 19. This construction maintains the conveyer at all times in proper position for supporting and advancing the carcasses. The shaft 14, projects outwardly, and is provided with a worm gear 20, on the outer end thereof, which meshes with a worm pinion 21, on a stud shaft 22, journaled in a bracket 23, secured to the frame. Said stud shaft also has a sprocket wheel 24, thereon, around which is trained a sprocket chain 25, which in turn is trained around a sprocket wheel 26, on the scraping wheel shaft 27. A gear 28, is secured to the scraper shaft 27, and meshes with a gear 29, journaled on a stud shaft 30. Said stud shaft 30, and drive shaft 5, have sprocket wheels 31—32, respectively secured thereon, around which are trained a sprocket chain 33. A belt 34, from a suitable source of power, transmits power to the mechanism by means of the friction pulley 35, on the drive shaft 5. Secured on the scraping shaft, 27, are a series of flexible scraping and massaging wheels, indicated in Fig. 1, as a whole by the reference numeral 36. Each wheel comprises radial arms or spokes comprising flexible strips 37, of suitable width and length, in the present instance constructed of flexible belting, which are connected together at their inner ends by hub members 38, each of which has a rounded portion to fit to and conform to the curvature of the shaft and radial arms 39, disposed at right angles with respect to one another, adjacent pairs of which engage the inner ends of the flexible strips 37, therebetween, all of which are bolted together. Said arms are rounded at their outer ends to permit free bending of the flexible strips.

Rigidly secured to the outer ends of the flexible arms or spokes 37, are wide strips or sections 40, of flexible belting, having their ends overlapped and secured to the arms or spokes by means of bracket members or angle irons 41. Interposed between each pair of flexible arms 37, is a flexible member 42, as shown, a chain, which, as the wheel rotates, exerts a centrifugal outward throw to hold the flexible periphery of the wheel outwardly, and also serves to limit the outward throw thereof. The chain, while permitting the flexible periphery to yield in passing a carcass, acts immediately thereafter to maintain the normal peripheral conformation of the wheel. All of said wheels, as shown, are secured to the shaft in any suitable manner, as by keying or bolting the same thereto. Rigidly secured to the periphery of the wheel on the belt sections 40, are scraper blades 43, which may be of any desired length and may be flexible or not, as desired.

The scraping wheel, shown in Figs. 9 to 11, inclusive, comprises a hub 44, to which are secured radial spokes 45, which have a rim or felly 46, secured to the outer ends thereof. Said rim is provided with a plurality of peripheral notches or recesses 47, in which are pivoted scraping blades 48, by means of a pintle 49. As shown, a pushing spring 50, secured at one end to the rim, yieldingly holds the blades outwardly a distance limited by the length of the retaining chains 51, which are attached at their ends to the scrapers and to the rim.

In Fig. 13, I have illustrated a small capacity machine, in which the wheels act on carcasses supported adjacent thereby by a stationary support. This machine comprises a scalding vat 52, in which is pivoted a shaft 53, having a carcass pick-up cradle or dump 54, secured thereon. A lever 55, is secured to the shaft 53 for manually operating the dump to elevate the carcass and deposit it on the inclined stationary platform 56, from which the carcass rolls by gravity upon the supporting plate or platform 57, which is adapted to slide in ways 58—59. A cable 60, is secured at one end to the support 57, and trained around an idler pulley 61, and is engaged to one end of a lever 62, which is pivoted to the wall of the scraping tank 63. A platform 64, is secured beneath the supporting plate adapted to receive the carcasses thereon when the plate is elevated. A scraping mechanism denoted as a whole by the reference numeral 70, is rotatably secured in the scraping tank in position to act on carcasses loosely supported on said support 57. The scraping mechanism is the same as hereinbefore described.

The operation is as follows:

The carcasses, after being scalded in the scalding vat, are pushed onto the elevating conveyer 8, and delivered onto the conveyer 9. The machine may operate in two different ways, namely, the conveyer 9, can be continuously rotated to slowly move the carcasses past the beaters, or the conveyer 9, can be held stationary while the carcasses are being scraped after which the conveyer may be started to deliver the cleaned carcasses from the machine prior to refilling. In either event, the rotating flexible scraping wheels gently and continuously scrape and massage the carcass, during which operation the flexible wheels are adapted to flex continuously to conform to the carcass, thereby removing the hair by a gentle, continuous scraping and massaging motion. There is no beating of the carcass. Of course, the carcasses may be delivered to the conveyer 9, in any other manner, or the conveyer 9, may be replaced by any other suitable support, and I desire to claim broadly the scraping and massaging wheels in combination with any suitable support. A spraying device 71, of any suitable kind, is provided for spraying hot water upon the carcasses as they are treated, if so desired.

The scraping wheel shown in Figs. 9 to 11, inclusive, acts on the carcasses smoothly and gently. As the scraping wheel rotates, the springs 50 permit the scrapers 48, to yield in passing over the carcasses and said springs act to thrust said scrapers outwardly again after passing the carcasses, so that said scrapers will be in position to again scrape the carcasses. The longer the retaining chains 51, the greater the projection of the scrapers beyond the periphery of the wheel, so that the field of action of the scrapers may be varied through a wide range, as desired.

In the construction shown in Fig. 12, the scraping wheels are constructed substantially as hereinbefore described, but the wheels are of different diameters, and so arranged as to conform to the bodies of the carcasses. As shown, some wheels are of such diameter that the scrapers thereof reach to the face, snout and tail of the carcasses, while the diameters of other wheels permit the scrapers thereof to conform to the body of the carcasses.

In the construction shown in Fig. 13, the carcasses are scalded in vat 52, and when sufficiently treated, are pushed onto the ejector 54, and the handle 55, operated to dump the carcasses upon the platform 56, from whence they fall by gravity upon platform 57. This platform is a stationary support while the carcasses are being acted upon, and the scraping wheels continuously scrape and massage the carcasses, at the same time rotating and rolling them up on the platform, the rotation of the carcasses being augmented by gravity.

After a carcass is thoroughly cleaned, which is readily determined as the carcass is at all times under the inspection of the operator, the platform 57, is slid upwardly in the ways by operating lever 62, which permits the carcass dropping on platform 64, from whence it is removed by the operator.

It is obvious that a great many arrangements of the wheels on the shaft could be made, and that the wheels themselves could be modified and changed through a wide range, and I therefore desire to claim broadly a scraping wheel and arrangement thereof upon a shaft, and in combination with any kind of support for the carcass. I therefore do not desire to limit the patent granted otherwise than necessitated by the prior art.

I claim as my invention:

1. A carcass scraping wheel comprising a plurality of flexible spokes, flexible rim members secured to the spokes, scraping blades on said members, and flexible elements adapted to act centrifugally to hold said flexible members extended.

2. A carcass scraping wheel comprising a plurality of flexible spokes, flexible rim members secured to the spokes, scraping blades secured on said members, and chains forming a part of said wheel adapted to act centrifugally to hold said members extended.

3. A carcass scraping wheel embracing a plurality of hub members, arms integrally formed thereon, flexible spokes secured between adjacent arms of said hub members, flexible rim members secured to said spokes, and scraping blades mounted on said members.

4. A carcass scraping wheel embracing a plurality of hub members, flexible spokes secured therebetween, a flexible rim secured to said spokes, scraping blades mounted on said flexible rim, and flexible means connected to said hub members and to said rim adapted to act centrifugally to hold said flexible rim extended.

5. A carcass scraping wheel comprising a hub, spokes connected thereto, a flexible rim secured on said spokes, scraping blades on said flexible rim, and chains connected between said hub and flexible rim for limiting the outward throw of said flexible rim when the wheel is rotated.

6. A carcass scraping wheel embodying a hub, spokes attached thereto, scraping means connected with said spokes, and flexible means for limiting the outward throw of said scraping means.

7. A carcass scraping wheel embracing a hub, spokes attached thereto, scraping means connected with said spokes, and chains for limiting the outward throw of said scraping means.

8. A carcass scraping wheel comprising a hub, a flexible rim, scrapers mounted thereon, and chains connecting said hub and rim.

9. A scraping wheel embracing a hub, scraping means, and chains for limiting the outward movement of said scraping means from said hub.

10. A carcass scraping wheel comprising a plurality of hub members, flexible spokes secured therebetween, bracket members secured on said spokes, a flexible rim mounted on said bracket members, scraping blades disposed thereon, and means connected between each of said hub members and said rim adapted to act centrifugally to hold said rim extended and also serving to limit the outward throw of said rim.

11. In a hog scraping device a plurality of flexible spokes, flexible members secured thereto, scraping blades on said members, and flexible elements of greater length than said spokes adapted to act centrifugally to hold said flexible members extended.

12. In a device of the class described a flexible scraping wheel, and spoke members of different length for maintaining the peripheral conformation of the wheel when the wheel is rotated.

13. A carcass scraping wheel comprising a hub, a flexible rim, scrapers mounted thereon, and flexible members of different lengths connecting said hub and rim.

14. A carcass scraping wheel comprising a flexible scraping rim, and flexible spokes and chains for maintaining the peripheral conformation of the rim when the wheel is rotated.

15. A carcass scraping wheel embracing a flexible rim, scrapers thereon, a hub, flexible spokes connecting said hub and rim, and flexible members of a length different from the length of said spokes, said members connecting said hub and rim and serving to control the peripheral conformation of said rim.

16. A carcass scraping wheel embracing a flexible rim, scraper blades thereon, a hub, flexible spokes connecting said hub and rim, and chains of greater length than said spokes, with chains connecting said hub with said rim and adapted to hold the rim extended when the wheel is rotated.

17. The combination with a flexible carcass scraping rim, of flexible means connected thereto adapted to be changed in length for varying the configuration of said rim.

18. A scraping wheel comprising a hub, spokes secured thereto, a rim secured to the outer ends of said spokes, said rim having a plurality of recesses therein, scraping members pivoted in said recesses, and means for limiting the outward throw of said scraping members.

19. A scraping wheel comprising a hub, spokes secured radially thereto, a rim attached to said spokes and having a plurality of peripheral recesses therein, scraping members pivoted in said recesses, springs for holding the scraping members extended, and flexible means for limiting the outward movement of said scraping members.

20. A scraping device comprising a rim having recesses therein, scraping members pivotally mounted in said recesses, scraping blades on said pivoted members, springs in said recesses for holding said members pushed outwardly, and chains connected to said rim and to said members for limiting the outward movement of said scraping members.

21. A carcass scraping machine comprising, a tank, a rotatable scraping mechanism therein, an inclined support in said tank to one side of said scraping mechanism, and means for depositing a carcass over the top of said mechanism onto said support and in the field of operation of said scraping mechanism.

22. A carcass scraping machine comprising a tank, a rotatable scraping mechanism therein, a stationary platform in said tank below and to one side of said scraping mechanism, a movable carcass support above said platform adapted to receive a carcass from over the top of said mechanism and hold the same in position to be acted on by said scraping mechanism, and means for moving said support to permit the carcass to fall upon said platform for removal from the machine.

23. A carcass cleaning machine comprising a tank, a rotatable scraping mechanism therein, means for delivering a carcass thereover, a slidable inclined support for receiving said carcass to permit the same to be cleaned by said mechanism, a stationary platform beneath said support, and means for sliding said support upwardly away from said mechanism to permit the carcass to fall upon the stationary platform.

24. A carcass cleaning machine comprising a tank, a rotatable scraping mechanism therein, means for delivering a carcass over the top of said mechanism, inclined guides in said tank, a supporting plate slidable in said guides and normally adapted to receive the carcass and hold the same in the field of operation of said mechanism, a stationary platform below said supporting plate, and means for drawing said supporting plate upwardly in said guides to permit the cleaned carcass to fall upon said platform.

In testimony whereof I have hereunto subscribed my name in the presence of two subscribing witnesses.

JOHN W. KOHLHEPP.

Witnesses:
FRANK WATERFIELD,
EMIL MONHOF.